(12) United States Patent
Rattunde

(10) Patent No.: US 9,140,533 B2
(45) Date of Patent: Sep. 22, 2015

(54) MEASURING DEVICE FOR A PIPE-CUTTING MACHINE

(75) Inventor: Ulrich Rattunde, Bentwisch (DE)

(73) Assignee: RATTUNDE & CO. GmbH, Ludwigslust (DE)

( * ) Notice: Subject to any disclaimer, the term of this patent is extended or adjusted under 35 U.S.C. 154(b) by 122 days.

(21) Appl. No.: 14/111,766

(22) PCT Filed: Mar. 20, 2012

(86) PCT No.: PCT/EP2012/054926
§ 371 (c)(1),
(2), (4) Date: Oct. 14, 2013

(87) PCT Pub. No.: WO2012/143194
PCT Pub. Date: Oct. 26, 2012

(65) Prior Publication Data
US 2014/0223752 A1  Aug. 14, 2014

(30) Foreign Application Priority Data

Apr. 20, 2011 (DE) .......................... 10 2011 018 297

(51) Int. Cl.
*G01B 5/02* (2006.01)
*G01B 7/02* (2006.01)

(52) U.S. Cl.
CPC ... *G01B 5/02* (2013.01); *G01B 7/02* (2013.01)

(58) Field of Classification Search
CPC ............. G01B 5/02; G01B 5/025; G01B 7/02
USPC ........... 33/529, 783, 784, 792, 794, 795, 803, 33/805, 806, 810, 852, 811, 549
See application file for complete search history.

(56) References Cited

U.S. PATENT DOCUMENTS

| | | | | |
|---|---|---|---|---|
| 2,832,141 A | * | 4/1958 | Taylor | .......................... 33/27.03 |
| 3,805,552 A | | 4/1974 | Heald | |
| 5,231,766 A | * | 8/1993 | Pavlak | ............................ 33/529 |

(Continued)

FOREIGN PATENT DOCUMENTS

| | | |
|---|---|---|
| DE | 91 12 923 U1 | 2/1993 |
| DE | 10 2006 025506 A1 | 12/2007 |

(Continued)

*Primary Examiner* — Christopher Fulton
(74) *Attorney, Agent, or Firm* — Lazaris IP

(57) ABSTRACT

The invention relates to a measuring device for precisely determining the length of at least one longitudinal profile between two measuring arms opposite of one another, with said two measuring arms opposite of one another and a measuring stamp, which can be moved in one of the measuring arms by means of a linear guide. The longitudinal profile can be positioned such that one end abuts against the measuring stamp. The linear guide comprises a guide channel extending in a guiding direction and a guide element having an outer wall, which guide element can be moved back and forth in the guide channel along the guiding direction. The guide element comprises a first guide length and a first guide width and forms a first width/length ratio. On the outer wall, in a cross-section that is vertical to the guiding direction, indentations and/or protrusions are provided circumferentially in the guide section direction, each having an additional guide length, an additional guide width and an additional width/length ratio, wherein the additional width/length ratios are smaller than the first width/length ratio.

7 Claims, 3 Drawing Sheets

(56) References Cited

U.S. PATENT DOCUMENTS

| | | | | |
|---|---|---|---|---|
| 5,351,410 | A | * | 10/1994 | Hainneville ............... 33/542 |
| 5,758,431 | A | * | 6/1998 | Golinelli ................... 33/572 |
| 6,421,927 | B1 | * | 7/2002 | Bach et al. ................ 33/427 |
| 7,886,456 | B2 | * | 2/2011 | Rattunde ................... 33/832 |
| 7,918,034 | B2 | * | 4/2011 | Rattunde ................... 33/529 |

FOREIGN PATENT DOCUMENTS

| | | |
|---|---|---|
| DE | 20 2007 016049 U1 | 1/2008 |
| DE | 10 2007 008887 A1 | 8/2008 |
| DE | 10 2007 008887 B4 | 2/2010 |
| DE | 10 2006 025506 B4 | 3/2011 |

* cited by examiner

MEASURING DEVICE FOR A PIPE-CUTTING MACHINE

CROSS REFERENCE TO RELATED PATENT APPLICATIONS

This patent application is filed herewith for the U.S. National Stage under 35 U.S.C. §371 and claims priority to PCT application PCT/EP2012/054926, with an international filing date of Mar. 20, 2012. The contents of this application are incorporated in their entirety herein.

BACKGROUND OF THE INVENTION

The invention relates to a measuring device according to the preamble of Claim 1.

Measuring devices are known particularly in the prior art as component parts of integrated pipe-cutting machines for checking the length of pipe sections which have been cut to length from, in particular, a metallic hollow or solid profile.

A measuring device for the simultaneous checking of the length of pipe sections of a bundle is known for example from DE 10 2006 025506 B4. In this device a plurality of measuring stamps are arranged in a measuring arm. A drawback of these measuring stamps is the risk of self-locking rapidly arises.

In addition, measuring arms with a measuring stamp arrangement formed so as to be integrated in the material are known from DE 10 2007 008 887 B4. These joint-free measuring stamps are free of self-locking, but on account of the change in the material properties over the whole of the service life of the arrangement they nevertheless also influence the measurement results.

BRIEF SUMMARY OF THE INVENTION

The object of the invention is therefore to make available an improved measuring device. This is attained by a measuring device mentioned in the introduction and having the features of precise determination of a length of at least one elongate profile between two mutually opposed measuring arms, in which the two mutually opposed measuring arms and a measuring stamp are movable in one of the measuring arms by means of a linear guide, wherein the at least one elongate profile is capable of being positioned for abutment with one end on the measuring stamp, characterized in that the linear guide has a guide channel formed in a guiding direction and a guide element with an outer wall which is movable in a reciprocating manner in the guide channel along the guiding direction, the guide element having a first guide length and a first guide width and forms a first width/length ratio, and at least one of protrusions and indentations orientated in a circumferential manner in the guiding direction in a cross-section at a right angle to the guiding direction, and characterized in that one further guide length and one further guide width in each case and one further width/length ratio in each case are provided on the outer wall, in that the further width/length ratios are smaller than the first width/length ratio claim 1. Preferred embodiments are set out in the sub-claims.

The measuring device according to the invention has two opposed measuring arms which are movable towards each other, in which case a linear guide is formed in at least one of the measuring arms. The linear guide has a measuring stamp as a guide element and an associated measuring-stamp guide channel. The measuring stamp is designed for the high-precision checking of the length of sections, preferably metallic pipe sections or metallic solid-profile sections, which have been cut to length by a cutting machine from a profile material in the form of a rod.

The measuring device is provided for the simultaneous checking of the length of at least two sections of a profile material in the form of a rod which have been cut to substantially equal lengths. In this case two opposed measuring arms are provided, between which the at least two sections are capable of being positioned adjacent to each other in the guiding direction and preferably in a bundle stacked in a pre-set manner on a receiving means. A travelling device, by which the distance between the two measuring arms is capable of being reduced, is provided for at least one of the two measuring arms. At least one of the measuring arms has at least one measuring stamp which is orientated in the guiding direction and which is capable of being moved by a linear guide—specified above—in the measuring arm. Each of the sections has precisely one measuring stamp associated with it, and each of the sections touches with one end precisely one of the measuring stamps of the one measuring arm and with the other end the other opposite measuring arm during the measurement.

A measuring device with a linear guide is proposed with a guide channel and a guide element which is capable of being moved in a reciprocating manner in the guide channel over a guide length. On account of a circumferential gap the guide element has play in the guide channel. The linear guide is provided, in particular, for a measuring device of a pipe-cutting machine.

If the quotient of the diameter of the guide element in relation to the guide length of the guide element exceeds a specific value dependent upon the coefficient of friction between the guide channel and the guide element, the linear guide is forcibly locked. This procedure is referred to as self-locking. Self-locking is generally known and is prevented in a conventional manner by guides of suitable length.

The invention also makes use of the idea of applying a micro-profile, which has a significantly more advantageous ratio of the diameter to the guide length of the guide element and which, as a result, counteracts self-locking, to the outer wall of the guide channel, which is referred to here as a macro-profile.

To this end, according to the invention, protrusions and/or indentations, which are formed in an elongate manner in each case in the guiding direction and which are orientated with further guide lengths and further guide widths, are provided on the outer wall of the guide element at a right angle to the guiding direction in a circumferential manner around the cross-section, the further width/length ratios being smaller than the first width/length ratio of the guide element. It is preferable for the further width/length ratios to be smaller than a tenth, and in a particularly preferred manner smaller than a 15th, of the first width/length ratio.

It is particularly preferred for the further protrusions and the further indentations all to have the same width/length ratio. As a result, the micro-profile is capable of being applied to the outer wall of the guide element and of being produced in a particularly inexpensive manner.

The design of the cross-section of the guide element and/or the design of the cross-section of the indentations and/or protrusions of the micro-profile may be varied. It is advantageous for the cross-section both of the guide element and of the indentations and/or protrusions to be made constant over the entire respective guide length.

In a preferred embodiment of the invention the cross-section of the guide element is made substantially rectangular or square. It is particularly preferred for the four outer walls of the guide element which are formed to be provided with indentations and/or protrusions which extend in the guiding direction and which are made preferably semicircular in the cross-section at a right angle to the guiding direction. Trapezoidal, rectangular or square cross-sections, however, are also possible. The cross-sections of the individual protrusions and/or indentations may be different amongst themselves. What is crucial is only that the width/guide length ratio of the protrusions and/or indentations is smaller, preferably significantly smaller, i.e. less than a tenth, than the width/guide length ratio of the guide element itself.

BRIEF DESCRIPTION OF THE SEVERAL VIEWS OF THE DRAWINGS

The invention is described in four figures with reference to an embodiment. In the drawings.

DETAILED DESCRIPTION OF THE INVENTION

Figure 1:
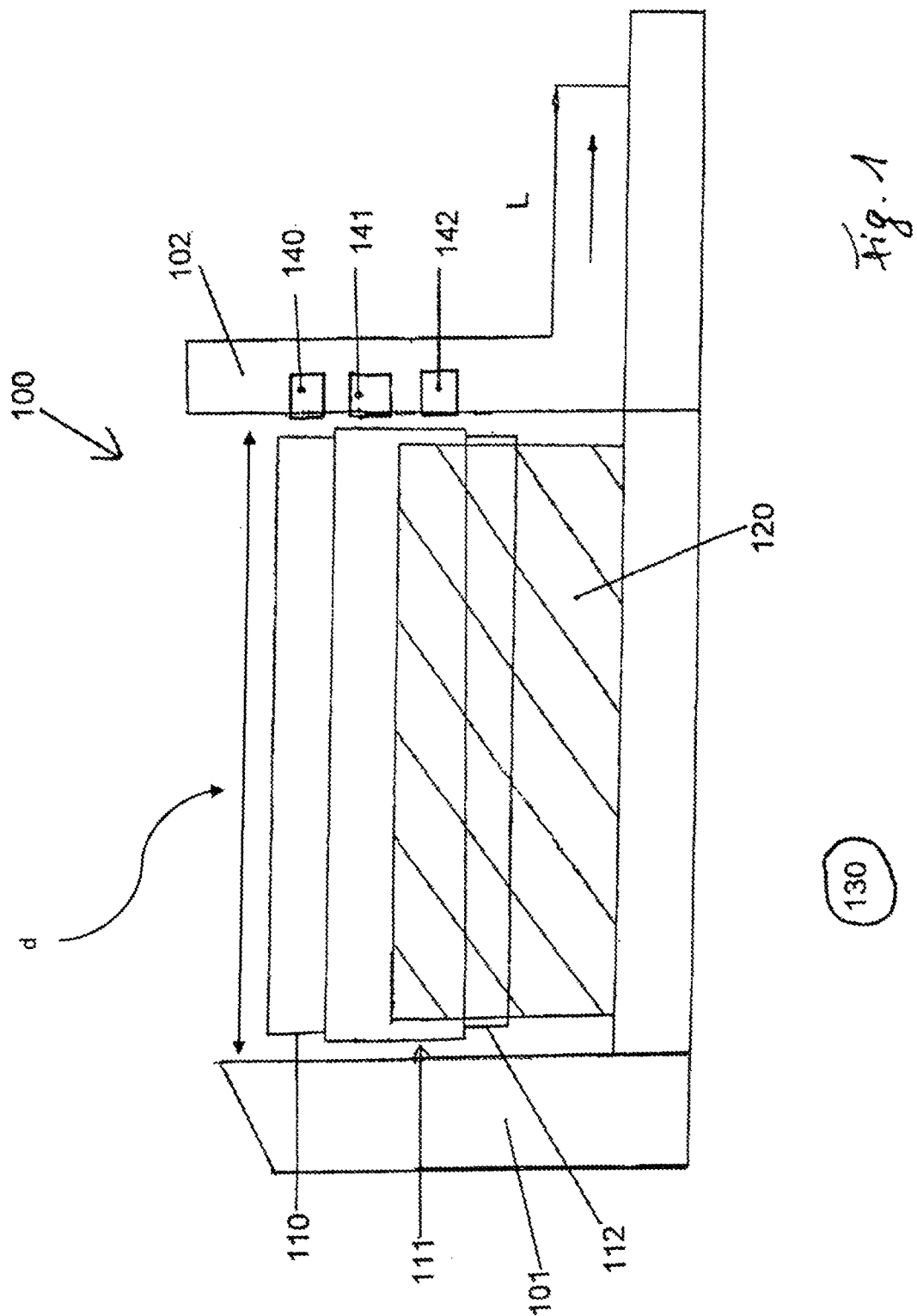
FIG. 1 is a diagrammatic side view of a measuring device according to the invention for a plurality of pipe sections cut to length.

FIG. 1 shows a measuring device 100 with opposed measuring arms 101, 102 which are arranged at a variable clear distance d from each other. A plurality of pipe sections, in this case up to four, 110, 111, 112, 113 of substantially the same length can be received between the two measuring arms 101, 102. The pipe sections can be measured simultaneously with a high degree of precision in the respective length thereof by means of the measuring device 100.

An integrated pipe-cutting machine is provided in order to cut the metallic pipe sections 110, 111, 112, 113 to length from a metallic pipe (not shown). The pipe sections 110, 111, 112, 113 cut to length are subjected to an after-treatment, for example in the form of bevelling, deburring, washing etc., after being cut to length. The customers' requirements concerning the precision of the length are highly demanding. By way of example, pipe sections 110, 111, 112, 113 of a length of 0.5 m with a tolerance of 0.1 mm must meet a process capability of Cpk=1.33, in other words 99.994% of all pipe sections 110, 111, 112, 113 must be within the specified tolerance. After being cut to length the pipe sections 110, 111, 112, 113 naturally have substantially the same length. Since each cutting procedure is subject to slight inaccuracies, however, the length of the sections must be checked within the framework of the above accuracy after each cutting to length in order to ensure the standards specified above.

The measuring device 100 has a prismatic receiving means 120 for up to four pipe sections 110, 111, 112, 113 of substantially the same length. To this end, a bundle of up to four pipe sections 110, 111, 112, 113 of substantially the same length in each case is positioned by means of a gripping arm (not shown) on the receiving means 120 formed in a prismatic manner in the cross-section at a right angle to the plane indicated in FIG. 1. The stacked arrangement of the pipe sections 110, 111, 112, 113 inside a bundle of four is the same in any gripping, insertion and measurement cycle. The angle of the prismatic receiving means 120 and the diameter of the pipe sections 110, 111, 112, 113 are adapted to each other and so, even if a repeated loading of the receiving means 120 with four pipe sections 110, 111, 112, 113 is only approximately exact, they forcibly ensure an always constant positioning of the pipe sections 110, 111, 112, 113 inside the bundle in the receiving means 120. The measuring device 100 has a measuring arm 101, which is stationary with respect to the ground 130 or the pipe-cutting machine, i.e. is fixed in position, and a measuring arm 102, which is movable with respect to the ground 130 or the pipe-cutting machine. Four measuring stamps 140, 141, 142, 143 are provided in this case on the movable measuring arm 101, 102 above the prismatic receiving means 120. The measuring stamps 140, 141, 142, 143 are movable in the movable measuring arm 102 itself in a resilient reciprocating manner relative to the latter. A depth of penetration of the measuring stamps 140, 141, 142, 143 into the measuring arm 102 is determined by means of an inductive path measurement system. The inductive measurement system measures the depth of penetration of the measuring stamp 140, 141, 142, 143 into the measuring arm 102 to up to 0.001 mm. The measurement data are supplied to an electronic evaluation unit (not shown). Each of the measuring stamps 140, 141, 142, 143 is arranged in a measuring stamp channel 170, 171, 172, 173 so as to be movable in a reciprocating manner in the guiding direction L. In this case each of the measuring stamps 140, 141, 142, 143 has play in its measuring stamp channel 170, 171, 172, 173.

Figure 2:
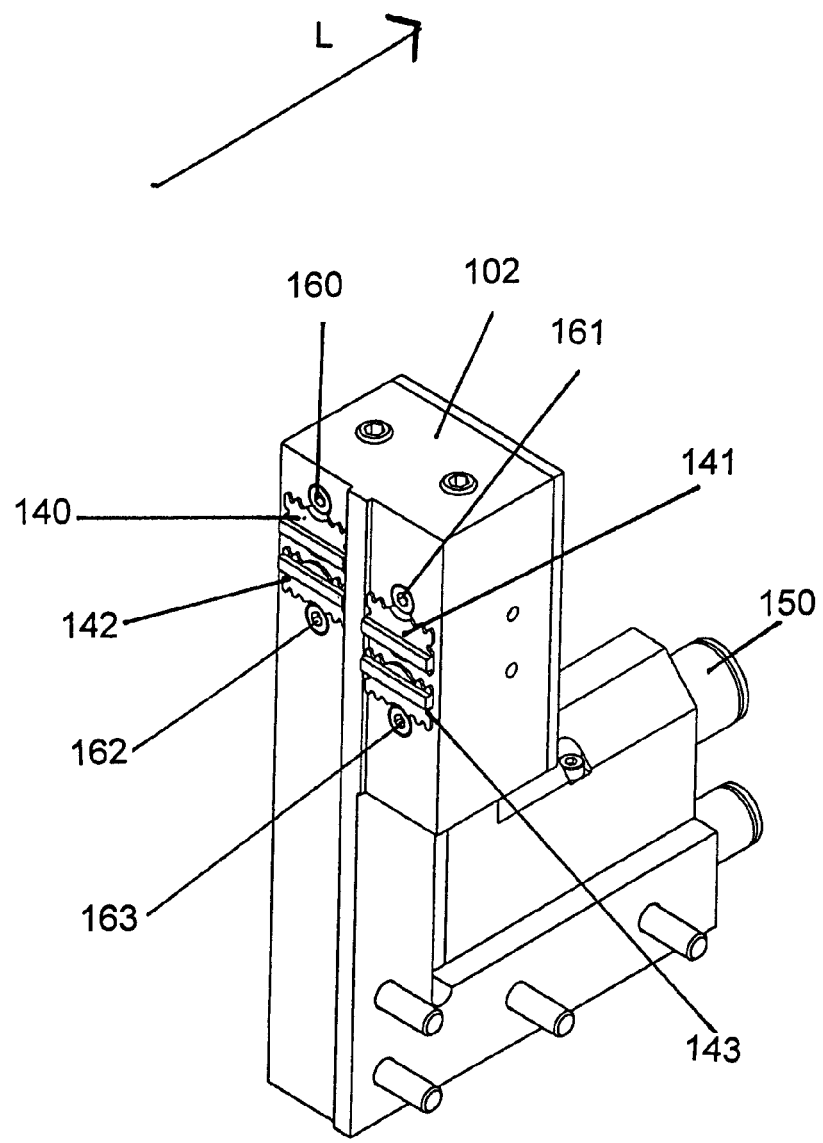
FIG. 2 is a perspective view of the measuring arm with measuring stamps in FIG. 1.

FIG. 2 shows the movable measuring arm 102 in a perspective view. The four measuring stamps 140, 141, 142, 143 are arranged offset with respect to one another on the side facing the prismatic receiving means 120.

FIG. 2 shows the measuring arm 102 illustrated diagrammatically in FIG. 1 in a perspective view. It has a compressed-air socket 150, by way of which compressed air is conveyed by way of a compressed-air duct to the inside of each of the measuring stamps 140, 141, 142, 143. The compressed air sets each of the four measuring stamps 140, 141, 142, 143 under a resilient pre-stressing which presses each of the four measuring stamps 140, 141, 142, 143 outwards in the direction of the prismatic receiving means 120.

Figure 3:
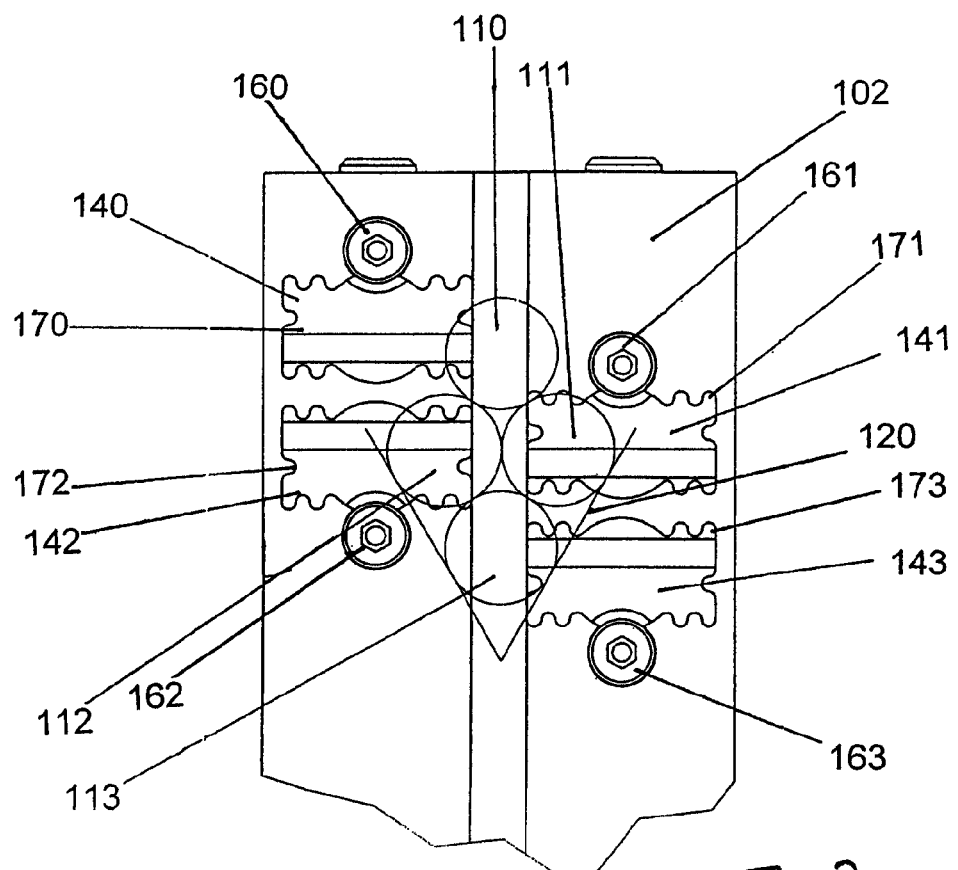
FIG. 3 is a front view of the measuring stamp in FIG. 2.

An extension limit in the form of a screw 160, 161, 162, 163 screwed into the outside of the measuring arm 102 and engaging behind the respective measuring stamp 140, 141, 142, 143 is provided on each of the four measuring stamps 140, 141, 142, 143. In the extended state each of the measuring stamps 140, 141, 142, 143 is calibrated to zero. After the insertion of a bundle of four the pipe sections 110, 111, 112, 113 rest against the four measuring stamps 140, 141, 142, 143, as shown in FIG. 3. In this case each of the pipe sections 110, 111, 112, 113 comes into contact with precisely one and only one measuring stamp 140, 141, 142, 143. After the insertion of the four pipe sections 110, 111, 112, 113 into the prismatic receiving means 120, which is likewise illustrated diagrammatically in FIG. 3, the measuring arm 102 is moved up to the prismatic receiving means 120, namely until each of the four pipe sections 110, 111, 112, 113 comes into contact on its side facing the movable measuring arm 102 with the measuring stamp 140, 141, 142, 143 associated with it. At this moment the length of each of the four pipe sections 110, 111, 112, 113 can be determined with the degree of precision specified above.

FIG. 3 also shows that as a rule the ends of the pipe sections 110, 111, 112, 113 touch the measuring stamps 140, 141, 142, 143 not in the middle and centrally, but laterally on the edge. Since each of the measuring stamps 140, 141, 142, 143 has play in its measuring stamp channel 170, 171, 172, 173, on account of the pressure exerted upon it de-centrally, the measuring stamp 140, 141, 142, 143 tilts to only a slight degree in the measuring stamp channel 170, 171, 172, 173. The measuring stamps 140, 141, 142, 143 according to the invention have eight protrusions 200, 201, 202, 203, 204, 205, 206, 207 in each case and two indentations 208, 209 in each case. The protrusions 200, 201, 202, 203, 204, 205, 206, 207 and indentations 208, 209 stabilize the reciprocating movement in the respective measuring stamp channel 170, 171, 172, 173 to a considerable degree, and in particular a self-locking is prevented completely.

Figure 4:
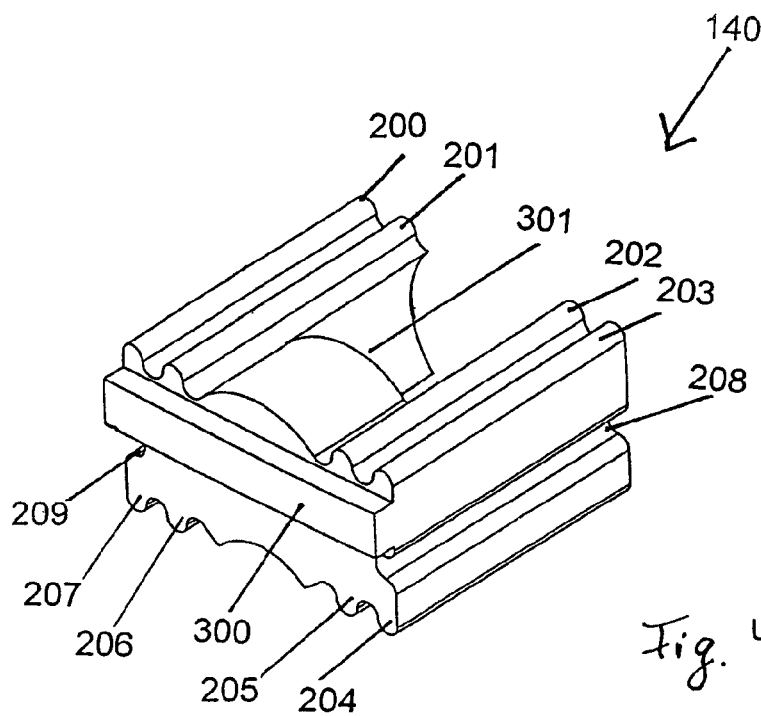
FIG. 4 is a perspective view of one of the four measuring stamps in FIGS. 1 to 3.

FIG. 4 shows one of the four measuring stamps 140, 141, 142, 143 in a perspective view. Each of the measuring stamps 140, 141, 142, 143 has to have play in the measuring stamp guide channel 170, 171, 172, 173 in order to remain movable at all. The circumferential gap is constantly cleaned of impurities by the compressed air exerted upon each of the measuring stamps 140, 141, 142, 143 on the inside. A problem with the gap in the case of a de-central exertion of force is the tilting of the measuring stamp 140, 141, 142, 143 in the measuring stamp guide channel 170, 171, 172, 173 and the self-locking which possibly arises as a result.

In the case of cylindrical measuring stamp guide channels 170, 171, 172, 173 the self-locking originates from the ratio between the diameter of the measuring stamp 140, 141, 142, 143 to the guide length of the measuring stamp guide channel 170, 171, 172, 173. If the quotient of the diameter/guide length exceeds a specific value dependent upon the coefficient of friction, the measuring stamp 140, 141, 142, 143 in the guide channel 170, 171, 172, 173 blocks forcibly. This is the self-locking mentioned above. This problem is usually eliminated with guides of suitable length in relation to the diameter of the measuring stamp. On account of the technical requirements demanded by customers for example or otherwise, low depths of penetration of the measuring arms 102 are promoted which cause as short a guide length as possible. The self-locking is just provoked as a result. On account of the protrusions and indentations 200, 201, 202, 203, 204, 205, 206, 207, 208, 209, however, the measuring stamps 140, 141, 142, 143 can be kept very short and nevertheless do not jam in the guide channel.

The measuring stamps 140, 141, 142, 143 in FIG. 4 are also provided on the upper outer wall facing away from the ground 130 and on the lower outer wall facing towards the ground with protrusions 200, 201, 202, 203, 204, 205, 206, 207 semicircular in cross-section at a right angle to the guiding direction L and on their two lateral walls with one indentation 208, 209 in each case which is likewise made semicircular in cross-section at a right angle to the guiding direction L.

The protrusions 200, 201, 202, 203, 204, 205, 206, 207 and indentations 208, 209 respectively pass around the measuring stamp 140, 141, 142, 143 completely and are at substantially the same distances from one another. The micro-profile formed by the protrusions 200, 201, 202, 203, 204, 205, 206, 207 and indentations 208, 209 respectively on the originally rectangular outer wall—forming a macro-profile—of the measuring stamp 140, 141, 142, 143 is now responsible for the self-locking of the measuring stamp 140, 141, 142, 143. On account of the markedly small diameter of each of the protrusions 200, 201, 202, 203, 204, 205, 206, 207 in cross-section in relation to the constant longitudinal extension of the protrusions 200, 201, 202, 203, 204, 205, 206, 207 a significantly lower diameter/guiding length quotient of the micro-profile is formed with respect to the macro-profile of the measuring stamps 140, 141, 142, 143, which prevents the self-locking.

The measuring stamp 140 illustrated in FIG. 4 has on its side facing the prismatic receiving means 120 an abutment face 300 for the pipe section 110 and on its inner side a sensor measuring face 301 which acts as a measuring face of the inductive path measuring system (not shown).

LIST OF REFERENCES 100 measuring device
102 measuring arm
103 measuring arm
110 pipe section cut to length
111 pipe section cut to length
112 pipe section cut to length
113 pipe section cut to length
120 prismatic receiving means
130 ground
140 measuring stamp
141 measuring stamp
142 measuring stamp
143 measuring stamp
150 compressed-air supply
160 screw screwed in
161 screw screwed in
162 screw screwed in
163 screw screwed in
170 measuring stamp channel
171 measuring stamp channel
172 measuring stamp channel
173 measuring stamp channel
200 protrusion
201 protrusion
202 protrusion
203 protrusion
204 protrusion
205 protrusion
206 protrusion
207 protrusion
208 indentation
209 indentation
300 abutment face
301 sensor measuring face
d clear distance
L guiding direction

What is claimed is:

1. A measuring device for the precise determination of a length of at least one elongate profile between two mutually opposed measuring arms, and with the two mutually opposed measuring arms and a measuring stamp are movable by means of a linear guide within one of the measuring arms, wherein the at least one elongate profile is capable of being positioned for abutment with one end on the measuring stamp, characterized in that the linear guide has a guide channel formed in a guiding direction and a guide element with an outer wall which is movable in a reciprocating manner in the guide channel along the guiding direction, and the guide element has a first guide length and a first guide width and forms a first width/length ratio, and protrusions and/or indentations are provided on the outer wall in a cross-section at a right angle to the guiding direction and the protrusions and/or indentations are aligned in the guiding direction and the protrusions and/or indentations are each provided with one further guide length and one further guide width and with one further width/length ratio, and the further width/length ratios are smaller than the first width/length ratio.

2. A measuring device according to claim 1, characterized by a compressed-air supply on the side of the measuring stamp facing away from the support, by which compressed-air supply the measuring stamp is capable of being pressed against the support, and a gap which surrounds the measuring stamp and through which the compressed air flows out to the support.

3. A measuring device according to claim 1, characterized in that the further width/length ratios are the same between themselves.

4. A measuring device according to claim 1, characterized in that a plurality of protrusions and/or indentations extending in the guiding direction are provided on the outer wall and have one further guide length and one further guide width in each case.

5. A measuring device according to claim 1, characterized in that a guide element without the protrusions and indentations is made substantially rectangular in a cross-section at a right angle to the guiding direction.

6. A measuring device according to claim 1, characterized in that the second width/length ratio is smaller than a tenth of the first width/length ratio.

7. A measuring device according to claim 1, characterized in that protrusions are substantially semicircular in the cross-section at a right angle to the guiding direction.

* * * * *